United States Patent
Wang

(10) Patent No.: US 11,442,756 B2
(45) Date of Patent: Sep. 13, 2022

(54) COMMON SERVICE RESOURCE APPLICATION METHOD, RELATED DEVICE, AND SYSTEM

(71) Applicant: HUAWEI TECHNOLOGIES CO., LTD., Guangdong (CN)

(72) Inventor: Hua Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/793,451

(22) Filed: Feb. 18, 2020

(65) Prior Publication Data
US 2020/0183714 A1 Jun. 11, 2020

Related U.S. Application Data

(63) Continuation of application No. PCT/CN2018/100666, filed on Aug. 15, 2018.

(30) Foreign Application Priority Data

Aug. 18, 2017 (CN) .......................... 201710716453.8

(51) Int. Cl.
G06F 9/50 (2006.01)
G06F 9/455 (2018.01)
H04L 67/10 (2022.01)

(52) U.S. Cl.
CPC ............ G06F 9/455 (2013.01); G06F 9/5077 (2013.01); H04L 67/10 (2013.01)

(58) Field of Classification Search
CPC .... G06F 9/455; G06F 9/5077; G06F 9/45558; G06F 2009/4557; H04L 67/10;
(Continued)

(56) References Cited

U.S. PATENT DOCUMENTS 10,341,195 B1 * 7/2019 Balmakhtar ............ H04L 41/12
2017/0006083 A1 * 1/2017 McDonnell ............. H04L 67/06
(Continued)

FOREIGN PATENT DOCUMENTS

CN 104954220 A 9/2015
CN 105808316 A 7/2016
(Continued)

OTHER PUBLICATIONS

Office Action issued in Chinese Application No. 201710716453.8 dated Nov. 27, 2020, 7 pages.
(Continued)

*Primary Examiner* — Eyob Hagos
(74) *Attorney, Agent, or Firm* — Fish & Richardson P.C.

(57) ABSTRACT

Embodiments of this application provide a common service resource application method, a related device, and a system. The method includes: receiving, by a common service manager (CSM), resource requirement information of a common service required by a virtual network function (VNF); and then requesting, based on the resource requirement information of the common service required by the VNF, a virtualized infrastructure manager (VIM) to allocate a resource required by the common service of the VNF. In some embodiments, the CSM applies to the VIM for the resource of the common service required by the VNF, so as to avoid the VNF not working or service quality deteriorating because the common service has no available resource or resources are insufficient, and to avoid wasting common service resources.

14 Claims, 8 Drawing Sheets

(58) Field of Classification Search
CPC ............ H04L 41/0896; H04L 41/5054; H04L 41/0806; H04L 29/06; H04L 29/08; H04L 67/16; H04L 67/322; H04L 67/42; H04W 28/26

See application file for complete search history.

(56) References Cited

U.S. PATENT DOCUMENTS

| | | | | |
|---|---|---|---|---|
| 2017/0150399 | A1* | 5/2017 | Kedalagudde | H04L 43/16 |
| 2017/0346831 | A1* | 11/2017 | Liu | H04L 63/102 |
| 2018/0032362 | A1* | 2/2018 | Buil | H04L 67/10 |
| 2019/0028350 | A1* | 1/2019 | Yeung | H04L 9/0894 |
| 2020/0076709 | A1* | 3/2020 | Stenberg | H04W 24/02 |

FOREIGN PATENT DOCUMENTS

| | | | | |
|---|---|---|---|---|
| CN | 106792858 | A | 5/2017 | |
| CN | 106921977 | A | 7/2017 | |
| CN | 107003985 | A | 8/2017 | |
| CN | 107005431 | A | 8/2017 | |
| WO | 2015113234 | A1 | 8/2015 | |
| WO | 2016048430 | A1 | 3/2016 | |
| WO | WO-2016048430 | A1 * | 3/2016 | ......... H04L 41/0896 |
| WO | 2016192633 | A2 | 12/2016 | |
| WO | 2016192634 | A2 | 12/2016 | |
| WO | 2016192639 | A1 | 12/2016 | |
| WO | 2017008980 | A1 | 1/2017 | |
| WO | 2017023741 | A1 | 2/2017 | |
| WO | 2017054129 | A1 | 4/2017 | |

OTHER PUBLICATIONS

ETSI GS NFV 002 V1.1.1 (Oct. 2013),Network Functions Virtualisation (NFV), Architectural Framework, 21 pages.

EETSI GS NFV 002 V1.2.1 (Dec. 2014),Network Functions Virtualisation (NFV), Architectural Framework, 21 pages.

PCT International Search Report and Written Opinion in International Application No. PCT/CN2018/100,666, dated Jun. 11, 2018, 15 pages (With English Translation).

Extended European Search Report issued in European Application No. 18846244.4 dated May 26, 2020, 8 pages.

Office Action issued in Chinese Application No. 201710716453.8 dated Jul. 4, 2021, 10 pages (with English translation).

* cited by examiner

COMMON SERVICE RESOURCE APPLICATION METHOD, RELATED DEVICE, AND SYSTEM

CROSS-REFERENCE TO RELATED APPLICATIONS

This application is a continuation application of International Application No. PCT/CN2018/100666, filed on Aug. 15, 2018, which claims priority to Chinese Patent Application No. 201710716453.8, filed on Aug. 18, 2017. The disclosures of the aforementioned applications are hereby incorporated by reference in their entireties.

TECHNICAL FIELD

This application relates to the field of electronic technologies, and in particular, to a common service resource application method, a related device, and a system.

BACKGROUND

A conventional telecommunications system includes various dedicated hardware devices, and different applications use different hardware devices. With the increase of network scale, the system becomes more complex. This brings many challenges, including development and launch of a new service, operation and maintenance of the system, resource utilization, and the like. To utilize a virtualization technology and a cloud computing technology in the IT industry and deal with these challenges, at an "SDN and OpenFlow World Congress" conference held on Oct. 22, 2012, thirteen major telecommunications operators around the world jointly release the NFV white paper, announce the establishment of an NFV ISG in the ETSI, and develop requirements and technical frameworks of NFV, so as to promote NFV development.

A network functions virtualization (Network Functions Virtualization, NFV) technology can be simply understood as that functions of network elements used in a telecommunications network are transferred from a current dedicated hardware platform to a general commercial off-the-shelf (COTS, Commercial off-the-shelf) server. The network elements used in the telecommunications network are converted into independent applications by using the NFV technology, and the applications may be flexibly deployed on a uniform infrastructure platform constructed based on devices such as a standard server, a memory, and a switch. Resource pooling and virtualization are performed on an infrastructure hardware device by using the virtualization technology, and virtual resources are provided to upper-layer applications, so as to implement decoupling between the applications and hardware, so that virtual resources can be quickly added to each application to quickly extend a system capacity, or virtual resources can be quickly reduced to shrink a system capacity, thereby greatly improving network flexibility. A general COTS server is used to form a shared resource pool, so that a hardware device does not need to be independently deployed for a newly developed service, greatly shortening a time to launch the new service.

A basis of the NFV technology includes the cloud computing technology and the virtualization technology. Hardware devices such as general COTS computing, storage, and network devices may be decomposed into various virtual resources by using the virtualization technology, so that the virtual resources are used by the various upper-layer applications. The virtualization technology implements decoupling between the applications and the hardware, so that a virtual resource supplying speed is greatly increased. The cloud computing technology can implement flexible scaling of the applications, and implement a match between the virtual resources and service loads. This not only increases utilization of virtual resources, but also increases a response rate of the system.

Currently, the promotion of common services on a public cloud and an enterprise private cloud is increasingly improved. How to further apply the common services in the field of NFV becomes a key topic at this stage. Because an NFV system architecture is designed relatively early, and a common service is not considered, the NFV architecture does not include a process and an interface for applying for and using a common service by a virtual network function (Virtual Network Function, VNF). In a process in which the VNF uses the common service in the future, it needs to be ensured that a common service corresponding to a capacity of the VNF can be obtained when the VNF applies for the common service, so as to avoid a case in which the VNF cannot work or service quality deteriorates because the common service has no available resource or resources are insufficient, and avoid a waste of common service resources. Therefore, how to apply for resources required by a common service by using the NFV system architecture becomes an urgent problem to be resolved.

SUMMARY

Embodiments of this application provide a common service resource application method, a related device, and a system, so as to apply for a resource required by a common service by using an NFV system architecture.

According to a first aspect, an embodiment of this application provides a common service resource application method, including:

receiving, by a common service manager CSM unit, resource requirement information of a common service required by a VNF; and then requesting, based on the resource requirement information of the common service, a virtualized infrastructure manager VIM unit to allocate a resource required by the common service of the VNF.

In this technical solution, the CSM unit applies to the VIM unit for the resource of the common service required by the VNF, so as to avoid that the VNF cannot work or service quality deteriorates because the common service has no available resource or resources are insufficient, and avoid a waste of common service resources. In addition, the CSM unit is introduced to an NFV architecture to unify interfaces for other network units to apply for the common service and manage a lifecycle of the common service.

In a first possible implementation of the first aspect, the CSM unit receives, from an NFVO unit by using an interface between the CSM unit and a network functions virtualization orchestrator NFVO unit, the resource requirement information of the common service required by the VNF. Alternatively, the CSM unit receives, from a VNFM unit by using an interface between the CSM unit and the virtualized network function manager VNFM unit, the resource requirement information of the common service required by the VNF.

With reference to the first possible implementation of the first aspect, in a second possible implementation of the first aspect, the resource requirement information of the common service required by the VNF is obtained by the VNFM unit based on a virtualized network function descriptor VNFD carried in a received VNF instantiation request message.

In this technical solution, the resource requirement information of the common service required by the VNF is determined by the VNFD based on the VNF instantiation request message. To be specific, a resource application process of the VNF when the VNF is instantiated and a resource application process of the common service required by the VNF are concurrently performed, so as to avoid rollback of the VNF instantiation process because the application fails, avoid that the VNF cannot provide a service function because the VNF fails to apply for the common service, and avoid that the service function or capacity is deteriorated because the VNF cannot apply for the sufficient common service. In addition, a VNF instantiation time can be reduced.

With reference to any one of the first aspect, or the first or the second possible implementation of the first aspect, in a third possible implementation of the first aspect, the CSM unit requests, based on the resource requirement information of the common service by using an interface between the CSM unit and the VIM unit, the VIM unit to allocate the resource required by the common service of the VNF. Alternatively, the CSM unit requests, based on the resource requirement information of the common service by using the interface between the CSM unit and the VNFM unit, the VNFM unit to allocate the resource required by the common service, so as to indicate that the VNFM unit requests the VIM unit to allocate the resource required by the common service of the VNF.

With reference to any one of the first aspect, or the first to the third possible implementations of the first aspect, in a fourth possible implementation of the first aspect, before the CSM unit requests, based on the resource requirement information of the common service, the VIM unit to allocate the resource required by the common service of the VNF, the CSM unit further requests, based on the resource requirement information of the common service, the VIM unit to reserve the resource required by the common service of the VNF.

In this technical solution, before requesting, the VIM unit to allocate the resource required by the common service of the VNF, the CSM unit first requests the VIM unit to reserve the resource required by the common service of the VNF. In this way, the VIM unit first allocates the resource required by the common service to the common service, so as to avoid a subsequent resource application failure of the common service because another service preempts the resource at the same time.

With reference to the fourth possible implementation of the first aspect, in a fifth possible implementation of the first aspect, the CSM unit requests, based on the resource requirement information of the common service by using the interface between the CSM unit and the VIM unit, the VIM unit to reserve the resource required by the common service of the VNF. Alternatively, the CSM unit requests, based on the resource requirement information of the common service by using the interface between the CSM unit and the VNFM unit, the VNFM unit to reserve the resource required by the common service, so as to indicate that the VNFM unit requests the VIM unit to reserve the resource required by the common service of the VNF.

With reference to any one of the first aspect, or the first to the fifth possible implementations of the first aspect, in a sixth possible implementation of the first aspect, the resource requirement information of the common service of the VNF includes a service type, an instance specification, and a quantity of instances.

With reference to the sixth possible implementation of the first aspect, in a seventh possible implementation of the first aspect, parameter types of the service type and the instance specification are identifiers, and a parameter type of the instance quantity is an integer.

With reference to the sixth possible implementation of the first aspect, in an eighth possible implementation of the first aspect, the service type and the instance specification are indicated by a common service member in the VNFD, and the instance quantity is indicated by a common service constituent member in a deployment configuration of the VNFD.

In a ninth possible implementation of the first aspect, the CSM unit allocates, based on the resource requirement information of the common service, the resource required by the common service.

In this technical solution, the CSM allocates, in a pre-deployed common service instance CS, the common service resource required by the VNF, so that the CS provides some shared resources to provide the common service for the VNF.

With reference to the ninth possible implementation of the first aspect, in a tenth possible implementation of the first aspect, before the CSM unit allocates, based on the resource requirement information of the common service, the resource required by the common service, the CSM unit further reserves, based on the resource requirement information of the common service, the resource required by the common service.

In this technical solution, before allocating the resource required by the common service of the VNF, the CSM unit first reserves the resource required by the common service of the VNF. In this way, the pre-deployed common service instance first allocates the resource required by the common service to the common service, so as to avoid the subsequent resource application failure of the common service because another service preempts the resource at the same time.

According to a second aspect, an embodiment of this application provides a common service manager unit, including a processor, a memory, and a transceiver. The processor is connected to the memory and the transceiver. For example, the processor may be connected to the memory and the transceiver by using a bus. The transceiver is configured to communicate with another network device. The memory is configured to store a set of program code. The processor invokes and executes the program code stored in the memory, to instruct the common service manager unit to execute some or all of the processes of the first aspect.

According to a third aspect, an embodiment of this application provides a common service resource application apparatus, where the apparatus includes a CSM unit, a VNFM unit, an NFVO unit, and a VIM unit that are described in the first aspect.

According to a fourth aspect, an embodiment of this application provides a computer readable storage medium, where the storage medium stores an instruction, and when the instruction is run on a computer, the computer is enabled to perform the common service resource application method provided in any one of the first aspect or the implementations of the first aspect.

According to a fifth aspect, an embodiment of this application provides a computer program product including an instruction. When the computer program product is run on a computer, the computer is enabled to perform the common service resource application method provided in any one of the first aspect or the implementations of the first aspect.

BRIEF DESCRIPTION OF DRAWINGS

To describe technical solutions in the embodiments of this application or in the background more clearly, the following describes accompanying drawings required for describing the embodiments of this application or the background.

DESCRIPTION OF EMBODIMENTS

The following describes the embodiments of this application with reference to accompanying drawings in the embodiments of this application.

Figure 1:
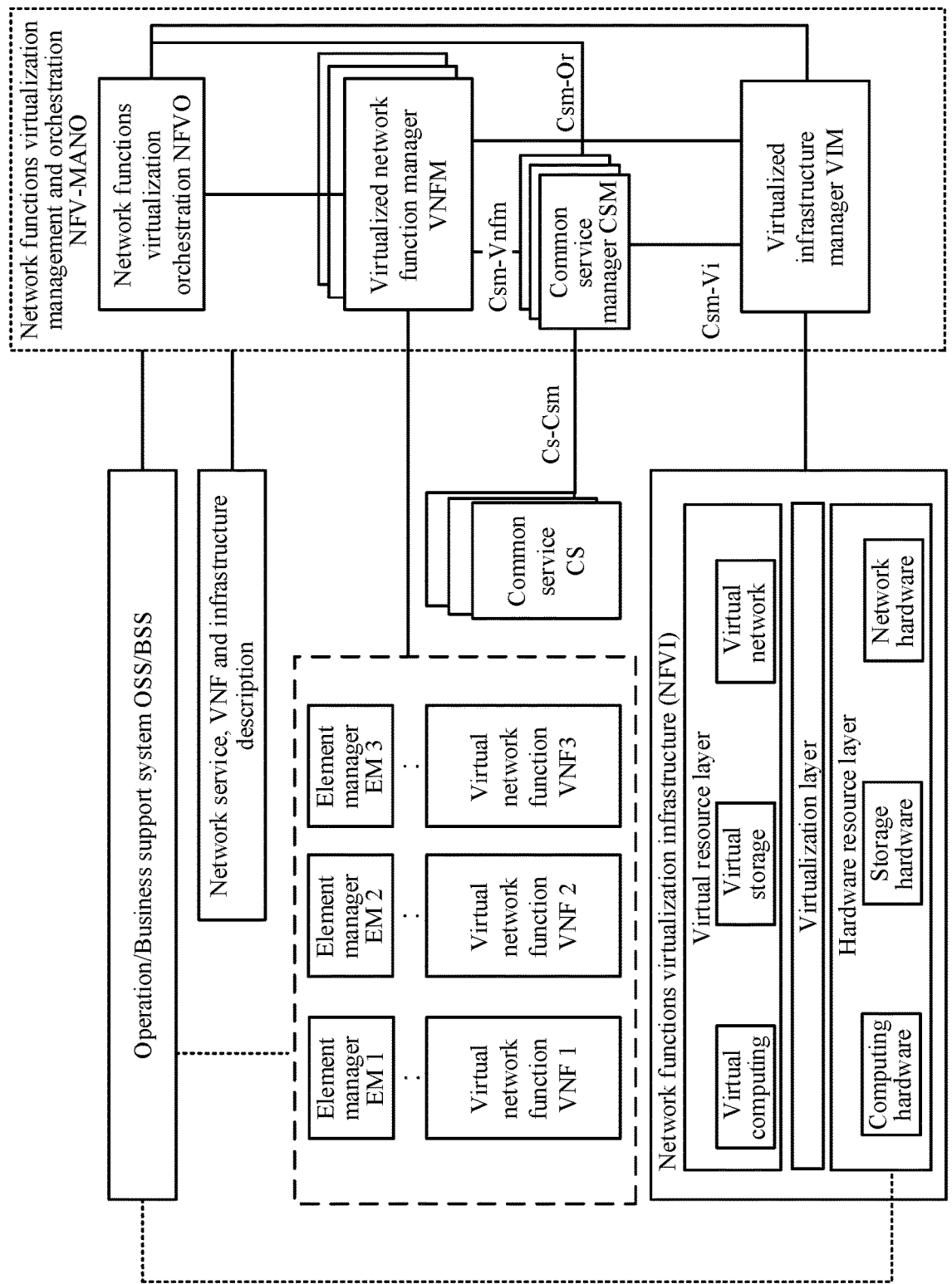
FIG. 1 is a schematic diagram of an NFV-based enhanced network architecture according to an embodiment of this application.

FIG. 1 is a schematic diagram of an NFV-based enhanced network architecture, mainly including: an operations support system (Operation Support System, OSS)/a business support system (Business Support System, BSS), an element management (Element Manager, EM) unit, a virtualized network function (VNF) unit, a network functions virtualization infrastructure (NFV Infrastructure, NFVI) unit, a common service (Common Service, CS) unit, and a network functions virtualization management and orchestration (NFV MANO) system. The network functions virtualization management and orchestration (NFV Management and Orchestration, NFV MANO) system includes a network functions virtualization orchestrator (NFV Orchestrator, NFVO) unit, a virtualized network function manager (VNF Manager, VNFM) unit, a virtualized infrastructure manager (Virtualized Infrastructure Manager, VIM) unit, and a common service manager (Common Service Manager, CSM) unit.

It should be noted that in the following descriptions, an acronym of each unit may be used for describing a corresponding unit, for example, the element management unit may be described as an EM or an EM unit. The following briefly describes the units.

The OSS/BSS is a system for supporting integration and information resource sharing of telecommunications operators, and mainly includes network management, system management, charging, business, accounting, customer services, and the like. The systems are integrated by using a specific information bus. The OSS/BSS can help the operators not only customize an operations support system but also determine system development directions and formulate system integration standards for users, optimizing and improving customers' service level. In the NFV-based network architecture, the OSS/BSS is configured to perform necessary modification and adjustment on lifecycle management (such as instantiation) of each network element.

The EM unit is configured to manage some VNF units.

The NFVI unit is a collective term of all hardware devices and software components in an environment having a capability of deploying network functions virtualization. The NFVI unit may cross a plurality of physical sites (for example, data center operating places) to perform extended deployment. In this case, a network providing a data connection for these physical sites may be considered as a part of the NFVI unit.

The NFVO unit may be configured to manage a lifecycle of a network service (Network Service, NS), coordinate NS lifecycle management, coordinate VNF lifecycle management (supported by the VNFM), and coordinate management of various resources of the NFVI unit (supported by the VIM), thereby ensuring optimal configuration of required resources and connections. The lifecycle management is management performed for instantiation, maintenance, and termination of the VNF unit, the NS unit, or the like.

The VNFM unit is responsible for lifecycle management of the VNF unit.

The VIM unit is responsible for controlling and managing computing resources, storage resources, and network resources of the NFVI unit. The VIM may be deployed in an infrastructure domain (for example, an NFVI access point/a service providing point) of an infrastructure network operator.

Compared with an original NFV system architecture, this application adds a CS unit and a CSM unit in an NFV-based enhanced network architecture.

The CS unit is a unit that provides a common service for at least one VNF instance, for example, may provide a common service for a common service instance. In this embodiment of this application, types of CS units may mainly include types of common services that need to apply for resources, such as a database, a cache, or a dispatcher. The common service CS unit may provide common service resources for a specific quantity of VNF instances, for example, may provide a public database for five VNF instances.

Specifically, there may be two types of CS units: a fixed deployment sharing type and an on-demand application exclusive type. A CS unit of the fixed deployment sharing type is deployed in advance based on a specific service volume by default, and may provide services for several VNFs at the same time. The CS unit exists regardless of whether the VNF applies for the services for use. A CS unit of the on-demand application exclusive type is deployed only when a VNF applies for a common resource service, and a deployed specific common resource instance provides a service only for the specific VNF that applies for the common resource service this time.

The CSM unit is mainly responsible for managing one or more CS units. A main function of the CSM unit is to manage a lifecycle of a CS unit, and provides management interfaces of the CS unit for peripheral units. The management interfaces include: an interface Csm-Vnfm between the CSM and the VNFM, an interface Csm-Or between the NFVO and the CSM, an interface Csm-Vi between the CSM and the VIM, and an interface Cs-Csm between the common service and the CSM.

Basic operations between the CSM and the VNFM, and between the CSM and the NFVO are performed by using the interface Csm-Vnfm and the interface Csm-Or, and mainly include: an application service, a query service, an update service, a release service, an operation service, a scale in/out service, a service change notification, and the like. The CSM delivers an operation command to a specific common service unit by using the interface Cs-Csm. For a CS unit of the on-demand application exclusive type, the CSM needs to apply, by using the interface Csm-Vi, to the VIM for computing resources, storage resources, and network resources of the NFVI that are required by the common service unit.

Further, for application programming interface (API, Application Programming Interface) operations, interface parameters, and corresponding parameter information (for example, mandatory/optional, quantity, type, and description) that are provided on the Csm-Vnfm, the Csm-Or, and the Or-Vnfm, refer to Table 1.

TABLE 1

Interface parameter comparison table

| API operation | Parameter | Mandatory/ Optional | Quantity | Type | Description |
| --- | --- | --- | --- | --- | --- |
| Create service reservation request | Service Type | Mandatory | 1 | Identifier | Used to describe a type of a service that needs to be reserved, for example, a relational database and a cache |
| | Service instance specification | Mandatory | 1 | Identifier | Instance type of a specific service that needs to be reserved, where the instance type needs to match a type defined in a common service |
| | Service instance quantity | Mandatory | 1 | Integer | Quantity of instances of a specific service that needs to be reserved |
| | Start time | Mandatory | 0/1 | Timestamp | Indicating the earliest timestamp of a service that needs to be used. If the parameter is 0, it indicates that the service is used immediately |
| | End time | Mandatory | 0/1 | Timestamp | Indicating the latest timestamp of a service that needs to be used. If the parameter is 0, it indicates that the latest time is not limited |
| | Timeout time | Mandatory | 0/1 | Timestamp | Indicating that a CSM can release a reserved service if a resource is not applied within the time |
| | Location constraint | Mandatory | 0/1 | | Location constraint of a resource to be allocated, for example, a specific resource area |
| | Resource group identifier | Mandatory | 1 | Identifier | Identifier of a logical NFVI resource group of a virtual |

TABLE 1-continued

Interface parameter comparison table

| API operation | Parameter | Mandatory/ Optional | Quantity | Type | Description |
|---|---|---|---|---|---|
| | | | | | resource allocated to a tenant in an NFVI domain |
| Create service reservation response | Reservation identifier | Mandatory | 1 | Identifier | Resource reservation number |
| | Service type | Mandatory | 1 | Identifier | Used to describe a type of a reserved service, for example, a relational database and a cache |
| | Service instance specification | Mandatory | 1 | Identifier | Instance type of a reserved specific service, where the instance type needs to match a type defined in a bulletin service |
| | Service instance quantity | Mandatory | 1 | Integer | Quantity of instances of a specific service that needs to be reserved |
| | Reservation status | Mandatory | 1 | Enumerated value | Service reservation status, for example, a reservation success or a reservation failure |
| | Start time | Mandatory | 0/1 | Timestamp | Indicating the earliest timestamp of a service that needs to be used. If the parameter is 0, it indicates that the service is used immediately |
| | End time | Mandatory | 0/1 | Timestamp | Indicating the latest timestamp of a service that needs to be used. If the parameter is 0, it indicates that the latest time is not limited |
| | Timeout time | Mandatory | 0/1 | Timestamp | Indicating that a CSM can release a reserved service if a resource is not applied within the time |
| Application service request | Service type | Mandatory | 1 | Identifier | Used to describe a type of a service, for example, a relational database and a cache |
| | Service name | Mandatory | 1 | Character string | Used to set the service name |
| | Reservation identifier | Mandatory | 1 | Identifier | Resource reservation number |

TABLE 1-continued

Interface parameter comparison table

| API operation | Parameter | Mandatory/Optional | Quantity | Type | Description |
|---|---|---|---|---|---|
| | Service instance specification | Mandatory | 1 | Identifier | Instance type of a specific service that needs to be applied, where the instance type needs to match a type defined in a common service |
| | Service instance quantity | Mandatory | 1 | Integer | Quantity of instances of a specific service that needs to be applied |
| | Metadata | Optional | 0 . . . N | Key value group | Metadata of an applied service, such as an engine type, a port number, an administrator name, and an initial password of a database |
| | Resource group identifier | Mandatory | 1 | Identifier | Identifier of a logical NFVI resource group of a virtual resource allocated to a tenant in an NFVI domain |
| | Location constraint | Mandatory | 0/1 | | Location constraint of a resource to be allocated, for example, a specific resource area |
| Application service response | Service data | Mandatory | 0/1 | Service data | Allocated service data |
| Query service request | Query service filter condition | Mandatory | 0 . . . N | Key value group | Query filter conditions, such as a name, an instance type, service data, an identifier, metadata, and a status |
| Query service response | Service data | Mandatory | 0 . . . N | Service data | Queried service data |
| Update service request | Service identifier | Mandatory | 1 | ID. | Service identifier that needs to be updated |
| | Service data | Mandatory | 1 | Service data | Service data that needs to be updated |
| Update service response | Service identifier | Mandatory | 1 | Identifier | Updated service identifier, which is the same as the update service request |
| | Service data | Mandatory | 1 | Service data | Updated service data |
| Release service request | Service identifier | Mandatory | 1 | Identifier | Released service identifier |
| Release service request | Service identifier | Mandatory | 1 | Identifier | Released service identifier, which is the same as a parameter for releasing the service request |

TABLE 1-continued

Interface parameter comparison table

| API operation | Parameter | Mandatory/ Optional | Quantity | Type | Description |
|---|---|---|---|---|---|
| Operation service request | Service identifier | Mandatory | 1 | Identifier | Service identifier that needs to be operated |
| | Service Operation | Mandatory | 1 | String | Operation types, such as starting, stopping, pausing, resetting, creating an image, and deleting the image |
| | Service operation input data | Optional | 0/1 | Key value group | Additional data related to operations, such as an image identifier to be deleted |
| Operation service response | Service identifier | Mandatory | 1 | Identifier | Service identifier that needs to be operated |
| | Service operation input data | Optional | 0/1 | Key value group | Output data of operations, such as an image identifier and a location that are successfully created |
| Scale in/out request | Service identifier | Mandatory | 1 | Identifier | Service identifier that needs to be scaled in/out |
| | Service data | Mandatory | 1 | Service data | Scale in/out service specification |
| Scale in/out response | Service identifier | Mandatory | 1 | Identifier | Service identifier that needs to be scaled in/out |
| | Service data | Mandatory | 1 | Service data | Scale in/out service specification |
| Subscription service change notification request | Subscription service filter conditions | Mandatory | 0/1 | Filter condition | Subscription service filter conditions, such as a name, service data, an identifier, and metadata |
| Subscription service change notification response | Subscription identifier | Mandatory | 1 | Identifier | Subscription identifier |
| Service change notification | Change identifier | Mandatory | 1 | Identifier | Unique identifier of the service change notification |
| | Service identifier | Mandatory | 1 | Identifier | Identifier of a changed common service |
| | CSM identifier | Mandatory | 1 | Identifier | CSM identifier that sends a change notification |
| | Change type | Mandatory | 1 | Character string | Change type, for example, entering a maintenance status, entering a fault status, recovering a normal status, or being restarted |

TABLE 1-continued

Interface parameter comparison table

| API operation | Parameter | Mandatory/ Optional | Quantity | Type | Description |
|---|---|---|---|---|---|
| | Service change data | Mandatory | 0/1 | | Specific service change detail, where a content depends on a change type |

For a specific function or indication content of each parameter corresponding to each API operation, refer to the content of a corresponding description part. In parameter information, "mandatory/optional" indicates whether the parameter is mandatory in the API operation. In other words, "mandatory" indicates that the parameter is mandatory, and "optional" indicates that the parameter is optional. The quantity indicates a quantity of specific parameters. For example, "1" indicates that there is one parameter, and "0 . . . N" indicates that a quantity of the parameters may be any quantity from 0 to N, where N is a positive integer. "0/1" indicates that the quantity of parameters may be 0, and the quantity of parameters may be 1. Types of the parameters include a character string, an integer, a timestamp, an identifier, an enumerated value, a key value group, service data, and a filter condition.

Timestamp: The timestamp indicates that a complete and verifiable data that exists before a specific time, and is usually a character sequence that uniquely identifies a time point.

Identifier: The identifier is information that can uniquely indicate a number, a name, an address, and the like of a specific parameter.

Enumerated value: The enumerated value includes customized and specific data and is a set of the data that has common features.

Key value group: The key value group, namely, a Key-ValuePair, is a pair of one-to-one data types.

Filter condition: The filter condition is a data type that represents conditions for filtering data.

Service data: For a definition, refer to Table 2.

TABLE 2

Service data definition table

| Attribute | Mandatory/ Optional | Quantity | Type | Description |
|---|---|---|---|---|
| Service identifier | Mandatory | 1 | Identifier | Identifier of a service |
| Service name | Mandatory | 0/1 | Character string | Name of a service |
| Specification identifier | Mandatory | 1 | Identifier | Name of a service instance type |
| Instance quantity | Mandatory | 1 | Integer | Quantity of service instances |
| Metadata | Optional | 0 . . . N | Key value group | Metadata of an applied service, such as an engine type, a port number, an administrator name, and an initial password of the database |

It should be noted that types of parameters that are not marked in Table 1 may be not limited. In other words, a specific type is not required.

A plurality of types of common services and inconsistent interfaces result in a problem that the NFVO and each VNFM need to use a different interface to connect to a plurality of common service manager units. In a network structure of this application, the CSM unit is introduced to unify the interfaces for the NFVO and the VNFM to reserve and apply for a common service and manage a lifecycle of the common service. Further, parameters of the service type, the service specification instance, and the service instance quantity are newly defined in an interface operation, and a resource operation for the common service is decoupled from the VNF.

Figure 2:
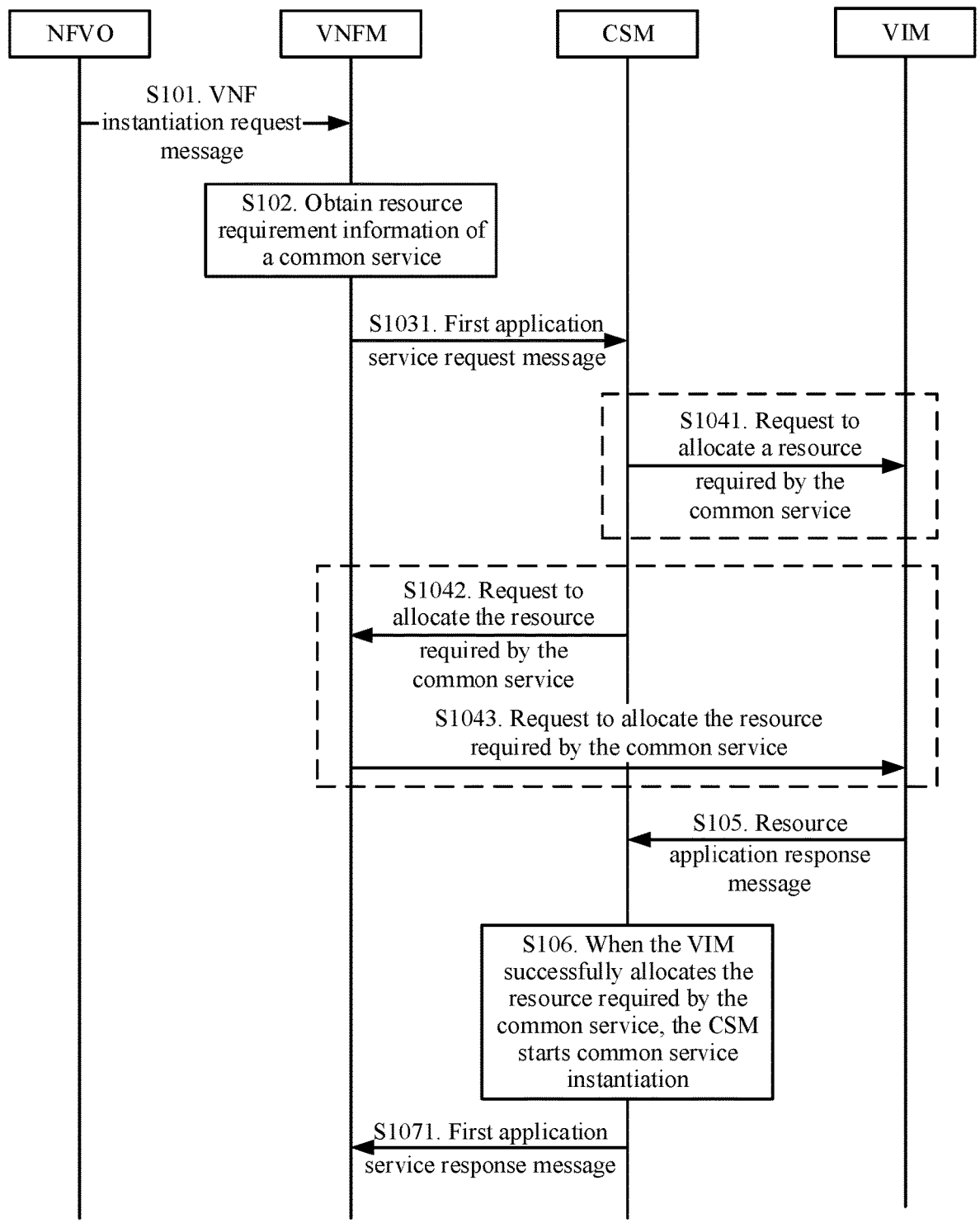
FIG. 2 is a schematic flowchart of a common service resource application method according to an embodiment of this application.
Figure 3:
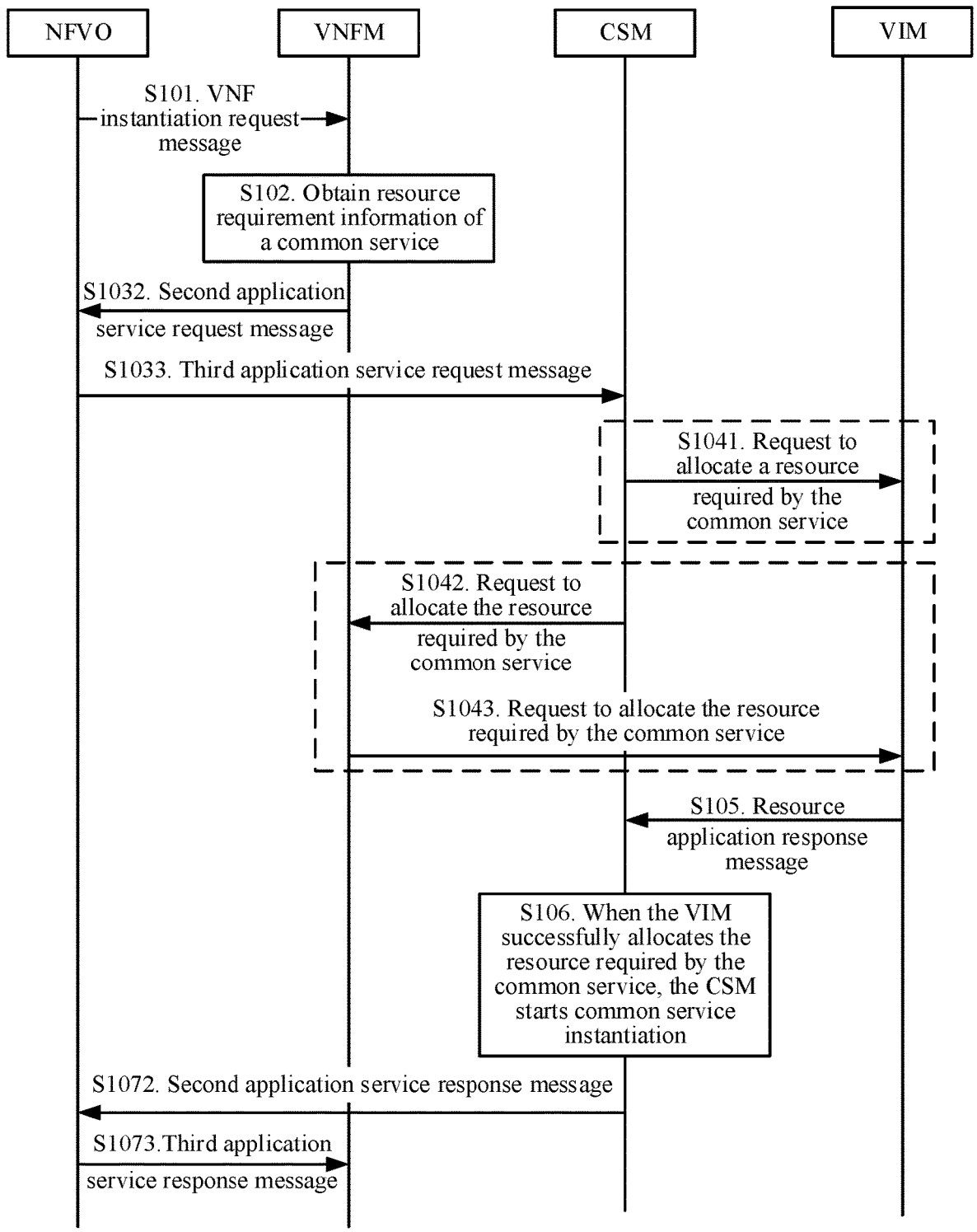
FIG. 3 is a schematic flowchart of another common service resource application method according to an embodiment of this application.

FIG. 2 and FIG. 3 are schematic flowcharts of two common service resource application methods according to an embodiment of this application. This embodiment is applicable to an implementation scenario in which a CS is of an on-demand application exclusive type. To be specific, in this embodiment, a CSM needs to apply to a VIM for a resource to instantiate a common service resource required by a VNF, so that the instantiated CS provides a common service specially for the VNF. The method includes but is not limited to the following steps.

S101. An NFVO sends a VNF instantiation request message to a VNFM.

The instantiation request message is used to instruct the VNFM to perform an instantiation operation on the VNF, where the VNF instantiation request message carries a virtualized network function descriptor (Virtualized Network Function Descriptor, VNFD). The VNFD is a configuration template that describes a deployment and operation behavior of the VNF, and is used for a running process of the VNF and lifecycle management of a VNF instance.

In this embodiment, the VNFD includes resource requirement information of the common service required by the VNF. The NFVO has declared, in the VNFD, the common service required by the VNF. Therefore, when reading data in the VNFD, the VNFM may obtain the resource requirement information of the common service required by the VNF. To be specific, when applying for the VNF instantiation, the VNFM also applies for instantiation of the common service required by the VNF.

The resource requirement information may include a service type, an instance specification, an instance quantity, and the like. For details, refer to Table 1. The service type may refer to a type of the common service that is currently applied for, for example, may be at least one type of a database, a cache, or a dispatcher. In the resource requirement information, different service types may be represented in a form of identifiers, for example, 1×1 and 1×2. The instance quantity refers to a quantity of instances that need to be generated during the instantiation of the common service that is currently applied for. The instance specification may indicate a size of the specification required for the instantiation of the common service that is currently applied for. In the resource requirement information, different instance specifications may be represented in a form of identifiers, for example, s11, s12, and s13. These identifiers that represent different instance specifications respectively have specific parameters of corresponding instance specifications.

For example, the NFVO sends the VNF instantiation request message to the VNFM, where the VNF instantiation request message carries the VNFD, and the VNFD includes the resource requirement information of the common service required by the VNF. The service type may be 1×1, the instance quantity may be 2, and the instance specification may be s12.

If the VNF records a specific type and a quantity of computing, storage, and network resources required by the common service, a common service resource definition is coupled with the VNF. When modifying a resource model, the common service requires that the VNFD needs to be modified together. In the VNFD, a parameter type of an identifier type is used to describe the service type of the common service, and the service type of the common service is decoupled from the quantity of computing, network, and storage resources that are actually applied for by the common service. If the common service modifies the resource model of the service, the VNF, the VNFM, and the NFVO do not need to perceive the modification.

It should be noted that, when declaring, in the VNFD, the common service required by the VNF, the NFVO needs to add the common service of the VNF to a basic member of the VNFD, so as to indicate the common service required by the VNF. For details, refer to Table 3. In Table 3, a type of a member identified as comm_service is Element. To be specific, the member may be expanded, and after the expansion, there are a plurality of parameters, and a quantity of the parameters is a positive integer from 0 to N. Other members in Table 3 are existing members in the VNFD when the VNF is deployed, and details are not described herein again.

TABLE 3

Example table of VNFD members

| Identifier | Type | Cardinality | Description |
| --- | --- | --- | --- |
| Id | Leaf | 1 | Identifier, for example, a name of the VNFD |
| vendor | Leaf | 1 | Vendor of the VNFD |
| descriptor_version | Leaf | 1 | Version of the VNFD |
| version | Leaf | 1 | Software version of a VNF |
| vdu | Element | 1 . . . N | Group of a specific VDU (virtual deployment unit) of a VNF |
| virtual_link | Element | 0 . . . N | Virtual network connection of a VNF |
| comm_service | Element | 0 . . . N | New member, where a common service is required by a VNF |
| lifecycle_event | Leaf | 0 . . . N | Function scripts or work flows for defining VNF lifecycle events (such as initialization, termination, politely closing, scale in/out, and updating/upgrading) |
| . . . | | | |
| deployment_flavour | Element | 1 . . . N | Assurance parameters and requirements for defining each deployment configuration |
| . . . | | | |

Further, for a common service member of the VNF, refer to Table 4. To be specific, the member is further included in the member identified as the comm service in Table 3. The leaf type refers to a direct parameter that cannot be expanded any more. It should be noted that Table 4 shows only a basic member of the common service of the VNF, but is not limited to the members listed in Table 4, and may further extend service-specific data, such as the engine type and the port number of the database.

In Table 4, the service type refers to the common service type, the instance_type refers to a specification of a common service instance, and the VNFD includes two parameters: the service type and an instance specification in resource requirement information of the common service required by the VNF, may be determined by using the two parameters of the service_type and the instance_type in Table 4.

TABLE 4

Example table of VNF common service members in a VNFD
Comm service element (vnfd: comm_service)

| Identifier | Type | Cardinality | Description |
| --- | --- | --- | --- |
| Id | Leaf | 1 | Identifier of a service |
| service_type | Leaf | 1 | Type of a service |
| instance_type | Leaf | 1 | Specification of a service instance |

Further, because a quantity of the common service instances is closely related to a configuration of VNF deployment, a common service constituent member of the VNF also needs to be added to the deployment configuration of the VNFD. To be specific, a member identified as a constituent_comm_service is added to a member included in a member identified as the deployment_flavour in Table 3 (referring to Table 5). Further, the member identified as a constituent_comm_service further includes a member identified as a comm_service_reference and a member identified as number_of_instances (referring to Table 6). Other members in Table 5 are existing members in the VNFD when the VNF is deployed, and details are not described herein again.

The member identified as the constituent_comm_service in Table 5 is used to describe a resource requirement of the common service that matches the deployment configuration of a current VNF. For example, the deployment configuration indicated by the flavour key in Table 5 is a "small" specification. Correspondingly, the constituent_vdu may describe a resource requirement of the VNF corresponding to the current "small" specification, and the constituent_comm_service may describe the resource requirement of the common service that is corresponding to the current "small" specification and that matches the currently deployed VNF.

Specifically, the member identified as the comm_service_reference in Table 6 may indicate an identifier of the common service, to be specific, associate members of the service identifier Id in Table 4, so as to indicate the service type and the instance specification of the common service. A type of the member identified as the comm_service_reference is a reference, to be specific, a link associated with other VNFD content. The member identified as the number_of_instances in Table 6 may indicate the quantity of the common service instances corresponding to a common service identifier indicated by the member identified as the comm_service_reference.

TABLE 5

Example table of VNF deployment configuration members in a VNFD Deployment flavour element (vnfd: deployment flavour)

| Identifier | Type | Quantity | Description |
|---|---|---|---|
| Id | Leaf | 1 | |
| flavour_key | Leaf | 1 | |
| constraint | Leaf | 0 ... N | |
| constituent_vdu | Leaf | 1 ... N | |
| constituent_comm_service | Leaf | 0 ... N | New member, used to describe requirements for a common service in a deployment configuration |

TABLE 6

Example table of constituent_comm_service members in a VNFD Constituent comm service (vnfd: deployment_flavour: constituent_comm_service)

| Identifier | Type | Quantity | Description |
|---|---|---|---|
| Identifier | Type | Cardinality | Description |
| Comm_service_reference | Reference | 1 | Associating a common service identifier vnfd: comm_service: id that should be used in a deployment configuration |
| number_of_instances | Leaf | 1 | Quantity of instances of a common service required in a deployment configuration |

S102. The VNFM obtains the resource requirement information of the common service.

After receiving the VNF instantiation request message of the NFVO, the VNFM may read the VNFD carried in the VNF instantiation request message, so as to obtain the resource requirement information of the common service required by the VNF included in the VNFD.

S103. The VNFM notifies the CSM of the resource requirement information of the common service.

In an implementation scenario shown in FIG. 2, the VNFM may directly send an application service request message to the CSM, and the S103 may be specifically an S1031.

S1031. The VNFM sends a first application service request message to the CSM, where the first application service request message includes the resource requirement information of the common service.

The VNFM sends the first application service request message to the CSM based on an application service request operation (which may be referring to Table 1) provided on the Csm-Vnfm interface, where the first application service request message includes the resource requirement information of the common service, and is used to instruct the CSM to request, based on the resource requirement information of the common service, the VIM to allocate a resource required by the common service.

The resource requirement information may include the service type, the instance specification, the instance quantity, and the like. The first application service request message may further include parameters such as a service name, a reservation identifier, metadata, a resource group identifier, and a location constraint. For a detailed description of a definition and a function of each parameter, refer to the description corresponding to the application service request operation in Table 1, and details are not described herein again.

In a possible implementation scenario, there may be a plurality of CSMs. In the implementation scenario shown in FIG. 2, each VNFM may prestore information about the plurality of CSMs, for example, service types, network addresses, and identification information that are corresponding to the CSMs. The VNFM may determine, from the plurality of CSMs based on the service type of the common service included in the resource requirement information of the common service, the CSM corresponding to the service type of the common service, and send the first application service request message to the CSM.

For example, it is assumed that a CSM 1, a CSM 2, and a CSM 3 exist, where a service type corresponding to the CSM 1 is a database, a service type corresponding to the CSM 2 includes a database and a cache, and a service type corresponding to the CSM 3 includes a database, a cache, and a dispatcher. If the service type of the common service included in the resource requirement information of the common service that is obtained by the VNFM is a cache, the VNFM may determine the CSM 2 or the CSM 3 as a target CSM, and send the first application service request message to the target CSM.

Further, optionally, in another possible implementation scenario, before the VNFM sends the first application service request message to the CSM, the VNFM may first request, by using the NFVO, the CSM to reserve the resource of the common service. In this case, if the reservation succeeds, the NFVO may notify the VNFM of the address of the CSM or an identifier of the CSM that is determined when the VNFM requests the reservation, so that the VNFM sends the first application service request message to the corresponding CSM based on the address of the CSM or the identifier of the CSM. In this case, no matter whether the VNFM prestores the information about the plurality of CSMs, the VNFM may directly determine, by receiving the address of the CSM or the identifier of the CSM that is sent by the NFVO, the CSM to which the first application service request message is sent. For a specific implementation of reserving the common service resource, refer to the embodiment shown in FIG. 4.

In an implementation scenario shown in FIG. 3, the VNFM needs to send an application service request message to the CSM by using the NFVO, and S103 may include S1032 and S1033.

S1032. The VNFM sends a second application service request message to the NFVO.

The second application service request message includes the resource requirement information of the common service, and is used to instruct the NFVO to send a third application service request message to the CSM. The second application service request message is similar to the first application service request message, and the resource requirement information may include the service type, the instance specification, the instance quantity, and the like. The second application service request message may further include parameters such as the service name, the reservation identifier, the metadata, the resource group identifier, and the location constraint. For the detailed description of the definition and the function of each parameter, refer to the description corresponding to the application service request operation in Table 1, and details are not described herein again.

In a possible implementation scenario, there may be the plurality of CSMs. In the implementation scenario shown in FIG. 3, if the VNFM does not store the information about the plurality of CSMs, the VNFM may first send the second application service request message to the NFVO, and send the resource requirement information of the common service to the CSM by using the NFVO.

S1033. The NFVO sends the third application service request message to the CSM based on the second application service request message.

The third application service request message includes the resource requirement information of the common service, and is used to instruct the CSM to request the VIM to pre-allocate the resource required by the common service. Further, based on the parameters carried in the second application service request message, the third application service request message may further include the parameters such as the service name, the reservation identifier, the metadata, the resource group identifier, and the location constraint.

In an implementation scenario of a plurality of CSMs, the NFVO may store information about the plurality of CSMs, for example, service types, network addresses, and identification information that are corresponding to the CSMs. The NFVO may obtain, based on the second application service request message, the service type of the common service included in the resource requirement information of the common service, then determine, from the plurality of CSMs, the CSM corresponding to the service type of the common service, and send the third application service request message to the CSM.

S104. The CSM requests, based on the resource requirement information of the common service, a VIM unit to allocate the resource required by the common service.

In a possible implementation, the CSM may directly request the VIM to allocate the resource, and S104 may be specifically S1041.

S1041. The CSM requests, based on the resource requirement information of the common service, the VIM to allocate the resource required by the common service.

The CSM may apply to the VIM for computing resources, network resources, and storage resources based on the received resource requirement information of the common service, so that the VIM allocates the resource required by the common service. Specifically, the CSM may send a computing resource application request message, a network resource application request message, and a storage resource application request message to the VIM, so as to separately apply to the VIM for the computing resources, the network resources, and the storage resources that are required by the common service for allocating.

In a possible implementation scenario, the resource requirement information of the common service is already quantifiable resource information. In this case, the CSM may directly request, based on the resource requirement information of the common service, the VIM to allocate the resource required by the common service.

In another possible implementation scenario, some or all information of the resource requirement information of the common service may be represented by using other information that cannot be quantized, such as an identifier. Therefore, the CSM may first determine, based on the resource requirement information of the common service, the resource requirement quantization information of the common service corresponding to the resource requirement information of the common service. In other words, the resource requirement information of the common service is converted into quantifiable resource requirement quantization information of the common service. Then, the CSM requests, based on the resource requirement quantization information of the common service, the VIM to allocate the resource required by the common service.

For example, the resource requirement information of the common service received by the CSM includes a service type of 1×2, an instance quantity of 2, and an instance specification of s13. The CSM may determine, based on a correspondence between an identifier of the service type and the service type, a correspondence between an identifier of the instance specification and the instance specification, the resource requirement quantization information of the common service corresponding to the resource requirement information of the common service. For example, for a comparison table of service types, refer to Table 7, and for a comparison table of instance specifications, refer to Table 8. The service type of 1×2, the instance quantity of 2, and the instance specification of s13 may be converted into resource requirement quantization information of a common service indicating that a service type is a database, a quantity of instances is 2, and an instance specification is a CPU of 8 G, a memory of 32 G, network bandwidth of 1.5 Gb/s, and storage space of 2 T. The CSM requests, based on the resource requirement quantization information of the common service, the VIM to allocate the resource required by the common service.

TABLE 7

Service type comparison table (example)
Service type

| | |
| --- | --- |
| lx1 | Cache |
| lx2 | Database |
| lx3 | Dispatcher |

TABLE 8

Instance specification comparison table 1 (example)

| Instance specification | CPU | Memory | Network bandwidth | Storage space |
| --- | --- | --- | --- | --- |
| sl1 | 2 G | 8 G | 0.5 Gb/s | 500 G |
| sl2 | 4 G | 16 G | 0.8 Gb/s | 1 T |
| sl3 | 8 G | 32 G | 1.5 Gb/s | 2 T |

In another possible implementation, the CSM needs to request, by using the VNFM, the VIM to allocate the resource, and S104 may be specifically S1042 and S1043.

S1042. The CSM requests, based on the resource requirement information of the common service, the VNFM to allocate the resource required by the common service.

S1043. The VNFM requests the VIM unit to allocate the resource required by the common service.

The CSM may apply to the VNFM for the computing resources, the network resources, and the storage resources based on the received resource requirement information of the common service. Further, the VNFM applies to the VIM for the computing resources, the network resources, and the storage resources, so that the VIM allocates the resource required by the common service. Specifically, the CSM may send the computing resource application request message, the network resource application request message, and the storage resource application request message to the VIM by using the VNFM, so as to separately apply to the VIM for the computing resources, the network resources, and the storage resources that are required by the common service for allocating.

For another specific implementation method of S1043, refer to S1041, and details are not described herein again.

Therefore, a process of a lifecycle management operation of the common service performed by the NFVO and the VNFM is decoupled from a process of an actual lifecycle management operation (for example, applying for the computing, storage, or network resources) of the common service performed by the CSM, so as to simplify VNFD creation, and simplify an operation process of common service management performed by the NFVO and the VNFM.

Further, S105 may be further performed after S104.

S105. The VIM sends a resource application response message to the CSM.

The resource application response message may include a computing resource application response message, a network resource application response message, and a storage resource application response message, and is used to indicate an application result of the resource required by the common service, for example, an application success or an application failure.

Further, S106 may be further performed after S105.

S106. When the VIM successfully allocates the resource required by the common service, the CSM starts common service instantiation.

When the VIM successfully allocates the computing resources, the network resources, and the storage resources that are required by the common service, the CSM may start an operation of the common service instantiation, so as to generate a common service instance exclusive to the VNF, namely, a CS unit. In other words, the CS unit provides the common service only for the current VNF.

In a possible implementation scenario, the CSM may feedback to the VIM, based on the computing resource application request message, the network resource application request message, and the storage resource application request message sent by the VIM, a response message, for example, the computing resource application response message, the network resource application response message, and the storage resource application response message. When the response message indicates that the VIM successfully allocates the computing resources, the network resources, and the storage resources required by the common service, the CSM starts the common service instantiation.

After starting VNF instantiation, the CSM applies for the resource required by the common services again. First, there may be a risk of the application failure, as a result, a process of the VNF instantiation also needs to be rolled back. Second, the VNF may fail to provide a service function because the VNF cannot apply for the common service. Third, the service function or a capacity may be degraded because the VNF cannot apply for a sufficient common service. Further, even if the common service resource is successfully applied, the VNF can be used only after the common service instantiation is started and the initialization is completed. This takes a relatively long time. However, in this application, a process in which the VNF applies for the resource and a process in which the common service applies for the resource is performed at the same time, so that a VNF instantiation time can be saved.

Further, in the implementation scenario shown in FIG. 2, S1071 may be further performed after S106.

S1071. The CSM sends a first application service response message to the VNFM.

The first application service response message is used to indicate that the resource required by the common service is successfully allocated. The first application service response message includes service data allocated to the common service required by the VNF. For details, refer to descriptions of an application service response operation in Table 1.

Further, when the common service is successfully applied, a VNF record (VNF Record, VNFR) in the VNFM may store related information of the common service applied by the VNF. Therefore, the VNFM also needs to add related members of the common service of the VNF in the VNFR, to be specific, members of the comm service in Table 9. Other members in Table 9 are all members that exist in the VNFR when the VNF instance is formed, and are not described herein. For a member of the common service of the VNF in the VNFR, refer to Table 10, in other words, the members further included in the comm service member in Table 9.

TABLE 9

An example table of members of the VNFR

| Identifier | Type | Quantity Cardinality | Description |
|---|---|---|---|
| ... | | | |
| comm_service | Leaf | 0 ... N | New member, used to record a deployed common service; use the following vnfr: comm_servcie to record information of a common service. |
| ... | | | |

TABLE 10

Example of the common service members of the VNF in the VNFR Comm Service Record (vnfr: comm_service)

| Identifier | Type | Quantity Cardinality | Description |
|---|---|---|---|
| id | Leaf | 1 | Identifier of a common service |
| service_type | Leaf | 1 | Type of a common service |
| instance_type | Leaf | 1 | Instance type of a common service |
| instance_number | Leaf | 1 | Quantity of instances of a common service |

In the implementation scenario shown in FIG. 3, S1072 and S1073 may be further performed after S106.

S1072. The CSM sends a second application service response message to the NFVO.

The CSM sends the second application service response message to the NFVO, where the second application service response message is used to indicate that the resource required by the common service is successfully allocated, and the second application service response message includes the service data allocated to the common service required by the VNF. For details, refer to the descriptions of the application service response operation in Table 1.

S1073. The NFVO sends a third application service response message to the VNFM based on the second application service response message.

The NFVO indicates, to the VNFM by using the third application service response message, that the resource required by the common service is successfully allocated, where the third application service response message may include the service data that is allocated to the common service required by the VNF and that is carried in the second application service response message.

Further, when the common service is successfully applied, based on the service data that is allocated to the common service required by the VNF and that is carried in the third application service response message, the VNF record (VNFR, VNF Record) in the VNFM may store the related information of the common service applied by the VNF. A specific implementation is the same as that in S1071, and details are not described herein again.

Figure 4:
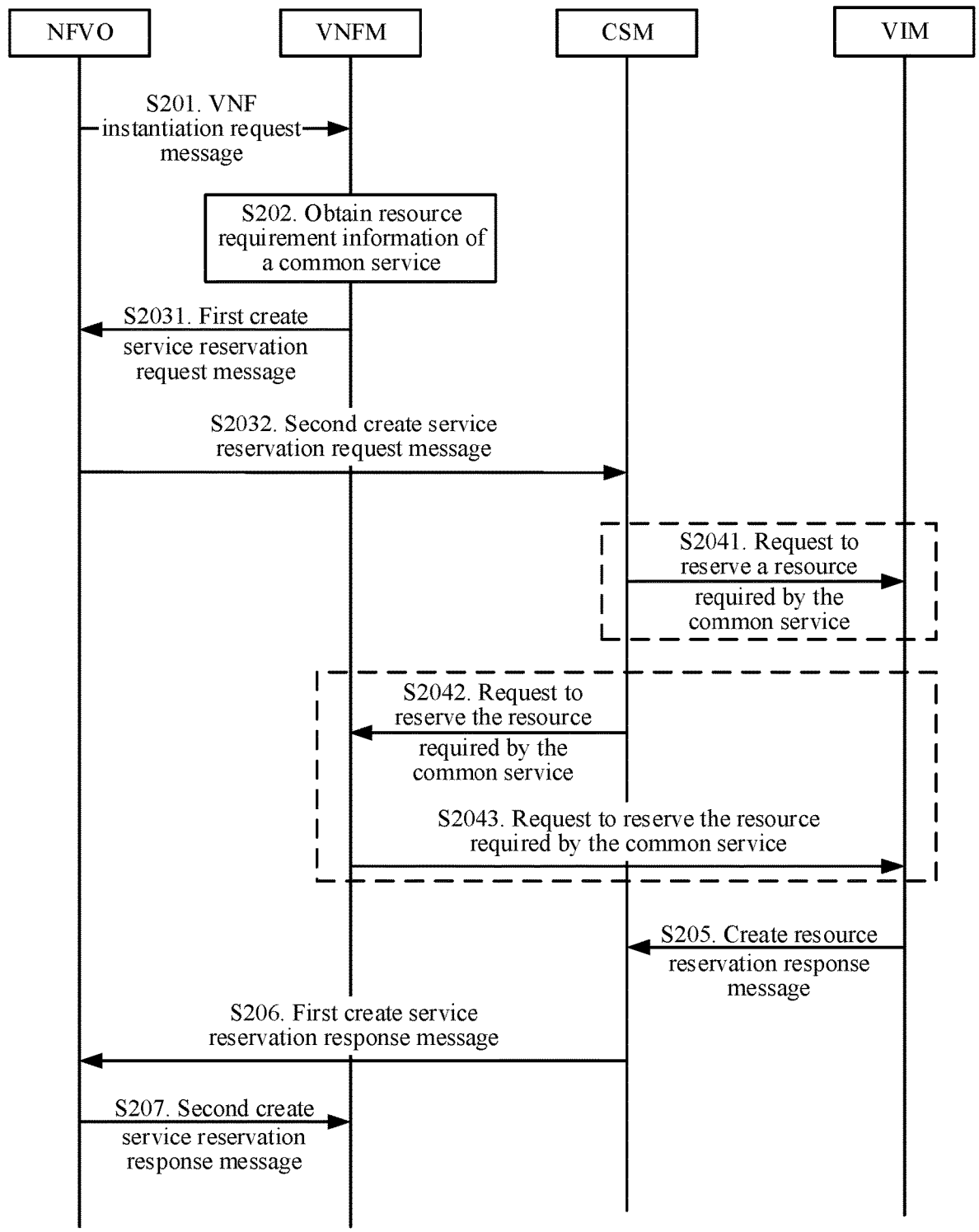
FIG. 4 is a schematic flowchart of a common service resource reservation method according to an embodiment of this application.

FIG. 4 is a schematic flowchart of a common service resource reservation method according to an embodiment of this application. This embodiment is applicable to an implementation scenario in which resource needs to be reserved before a common service resource is applied. Therefore, the method in this embodiment may be coupled with the embodiments shown in FIG. 2 or FIG. 3. To be specific, a resource reservation process is added before the VNFM/NFVO applies to the CSM for the common service resource. Further, this embodiment is applicable to an implementation scenario in which the CS is of an on-demand application exclusive type. To be specific, in this embodiment, the CSM needs to apply to the VIM for resource reservation, so as to reserve the common service resource required by the VNF. The method includes but is not limited to the following steps.

S201. The NFVO sends a VNF instantiation request message to the VNFM.

S202. The VNFM obtains resource requirement information of a common service.

It should be noted that, a difference between S201 and S202 in this embodiment and the embodiment shown in FIG. 2 or FIG. 3 lies in that after receiving the VNF instantiation request message, the VNFM triggers a create reservation request for the common service resource instead of an application request.

For another specific implementation of S201 and S202, refer to S101 and S102, and details are not described herein again.

S203. The VNFM notifies the CSM of the resource requirement information of the common service. Details may be S3031 and S3032.

S2031. The VNFM sends a first service create reservation request message to the NFVO.

The first create service reservation request message includes the resource requirement information of the common service, and is used to instruct the NFVO to send a second create service reservation request message to the CSM.

The resource requirement information may include a service type, an instance specification, an instance quantity, and the like. The first create service reservation request message may further include parameters such as a start time, an end time, a timeout time, a location constraint, and a resource group identifier. For detailed descriptions of a definition and functions of each parameter, refer to descriptions corresponding to service create reservation request operations in Table 1, and details are not described herein again.

S2032. The NFVO sends the second service create reservation request message to the CSM based on the first service create reservation request message.

The second service create reservation request message includes the resource requirement information of the common service, and is used to instruct the CSM to request the VIM to reserve a resource required by the common service. Further, based on the first service create reservation request message, the second service create reservation request message may further include the parameters such as the start time, the end time, the timeout time, the location constraint, and the resource group identifier.

In an implementation scenario of a plurality of the CSMs, the NFVO may store information about the plurality of CSMs, for example, a service type, a network address, and an identification information of the CSM. The NFVO may obtain, based on the first service create reservation request message, a service type of the common service included in the resource requirement information of the common service, then determine, from the plurality of CSMs, the CSM corresponding to the service type of the common service, and send the second service create reservation request message to the CSM.

S204. The CSM requests, based on the resource requirement information of the common service, the VIM unit to reserve the resource required by the common service.

In a possible implementation, the CSM may directly request the VIM to reserve the resource, and S204 may be specifically S2041.

S2041. The CSM requests, based on the resource requirement information of the common service, the VIM to reserve the resource required by the common service.

The CSM may create, based on the received resource requirement information of the common service, an application to the VIM for reserving computing resources, network resources, and storage resources, so that the VIM reserves the resource required by the common service. Specifically, the CSM may send a create computing resource reservation request message, a create network resource reservation request message, and a create storage resource reservation request message to the VIM, so as to separately apply to the VIM for the computing resources, the network resources, and the storage resources that are required by common service reservation creation. Reserving the resource required by the common service means that the VIM first allocates the resource required by the common service to the common service, so as to prevent another service from preempting the resource at the same time, resulting in a subsequent resource application failure of the common service.

In a possible implementation scenario, the resource requirement information of the common service is already quantifiable resource information. In this case, the CSM may directly request, based on the resource requirement information of the common service, the VIM to create the resource required for reserving the common service.

In another possible implementation scenario, some or all information of the resource requirement information of the common service may be represented by using other information that cannot be quantized, such as an identifier. Therefore, the CSM may first determine, based on the resource requirement information of the common service, the resource requirement quantization information of the common service corresponding to the resource requirement information of the common service. In other words, the resource requirement information of the common service is converted into quantifiable resource requirement quantization information of the common service. Then, the CSM requests, based on the resource requirement quantization information of the common service, the VIM to reserve the resource required by the common service. For specific examples, refer to the examples in S104, and details are not described herein again.

In another possible implementation, the CSM needs to request, by using the VNFM, the VIM to reserve the resource, and S204 may be specifically S2042 and S2043.

S2042. The CSM requests, based on the resource requirement information of the common service, the VNFM to reserve the resource required by the common service.

S2043. The VNFM requests the VIM unit to reserve the resource required by the common service.

The CSM may create the application to the VNFM for reserving the computing resources, the network resources, and the storage resources based on the received resource requirement information of the common service. Further, the VNFM creates the application to the VIM for reserving the computing resources, the network resources, and the storage resources, so that the VIM allocates the resource required by the common service. Specifically, the CSM may send the create computing resource reservation request message, the create network resource reservation request message, and the create storage resource reservation request message to the VIM by using the VNFM, so as to separately apply to the VIM for the computing resources, the network resources, and the storage resources that are reserved for the common service.

For another specific implementation method of S2043, refer to S2041, and details are not described herein again.

Further, S205 may be further performed after S204.

S205. The VIM sends a create resource reservation response message to the CSM.

The create resource reservation response message may include the computing resource application response message, the network resource application response message, and the storage resource application response message, and is used to indicate the application result of the resource required by the common service, for example, the application success or the application failure.

Further, S206 and S207 may be further performed after S205.

S206. When the VIM successfully reserves the resource required by the common service, the CSM sends a first service create reservation response message to the NFVO.

The CSM sends the first service create reservation response message to the NFVO, where the first service create reservation response message is used to indicate that the resource required by the common service is successfully reserved, and the first service create reservation response message includes parameters such as the resource requirement information (the service type, the instance specification, and the instance quantity), the reservation identifier, the reservation status, the start time, the end time, and the timeout time. For the detailed description of the definition and the function of each parameter, refer to the description corresponding to the service create reservation response operation in Table 1, and details are not described herein again.

S207. The NFVO sends, based on the first service create reservation response message, the second service create reservation response message to the VNFM.

The NFVO indicates, to the VNFM by using the second service create reservation response message, that the resource required by the common service is successful reserved, where the second service create reservation response message may include the parameters such as the resource requirement information (the service type, the instance specification, and the instance quantity), the reservation identifier, the reservation status, the start time, the end time, and the timeout time that are carried in the first service create reservation response message.

Further, the NFVO may further send an address of the CSM or an identifier of the CSM to the VNFM, where the address of the CSM or the identifier of the CSM is used to instruct the VNFM to request the CSM to allocate the resource required by the common service. The address of the CSM or the identifier of the CSM may be carried in the second service create reservation response message, or may be separately sent to the VNFM. This is not specifically limited herein.

Figure 5:
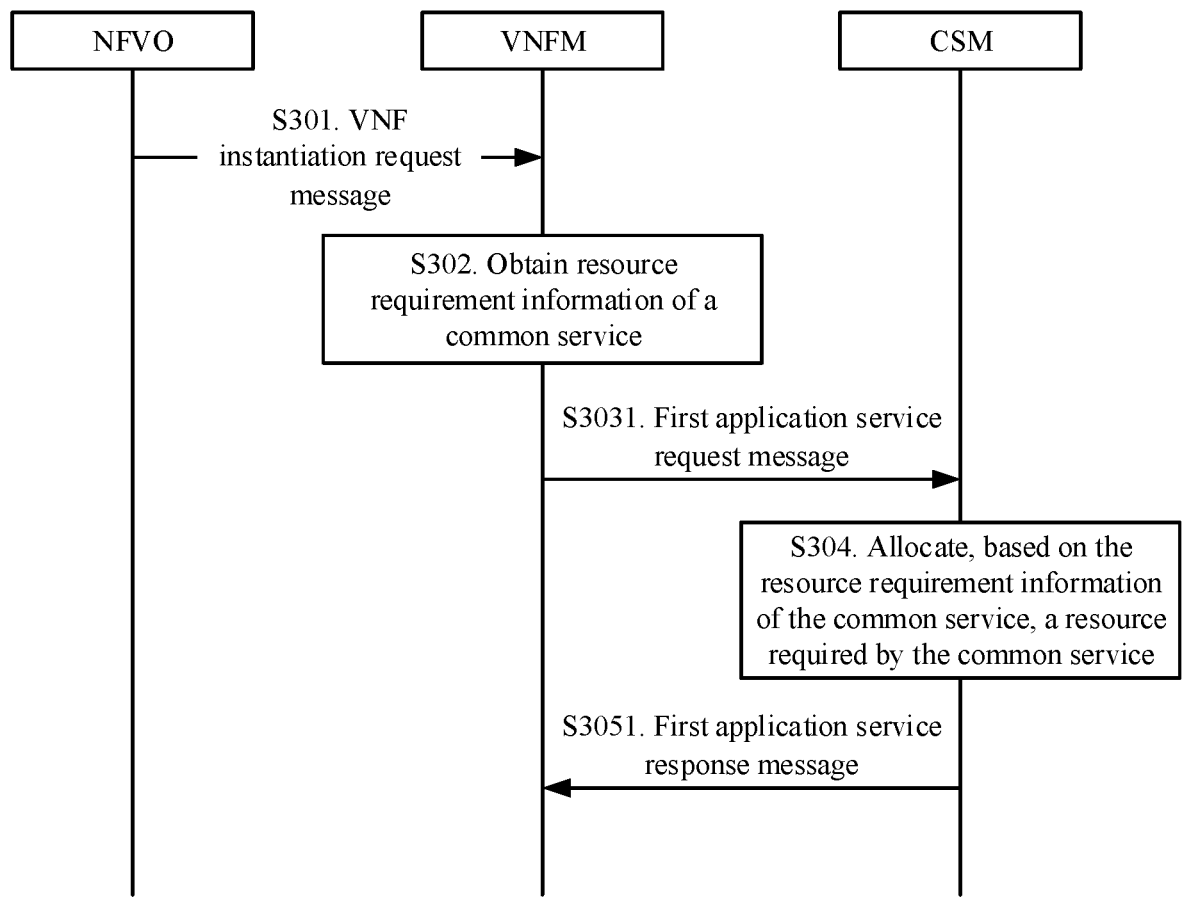
FIG. 5 is a schematic flowchart of another common service resource application method according to an embodiment of this application.
Figure 6:
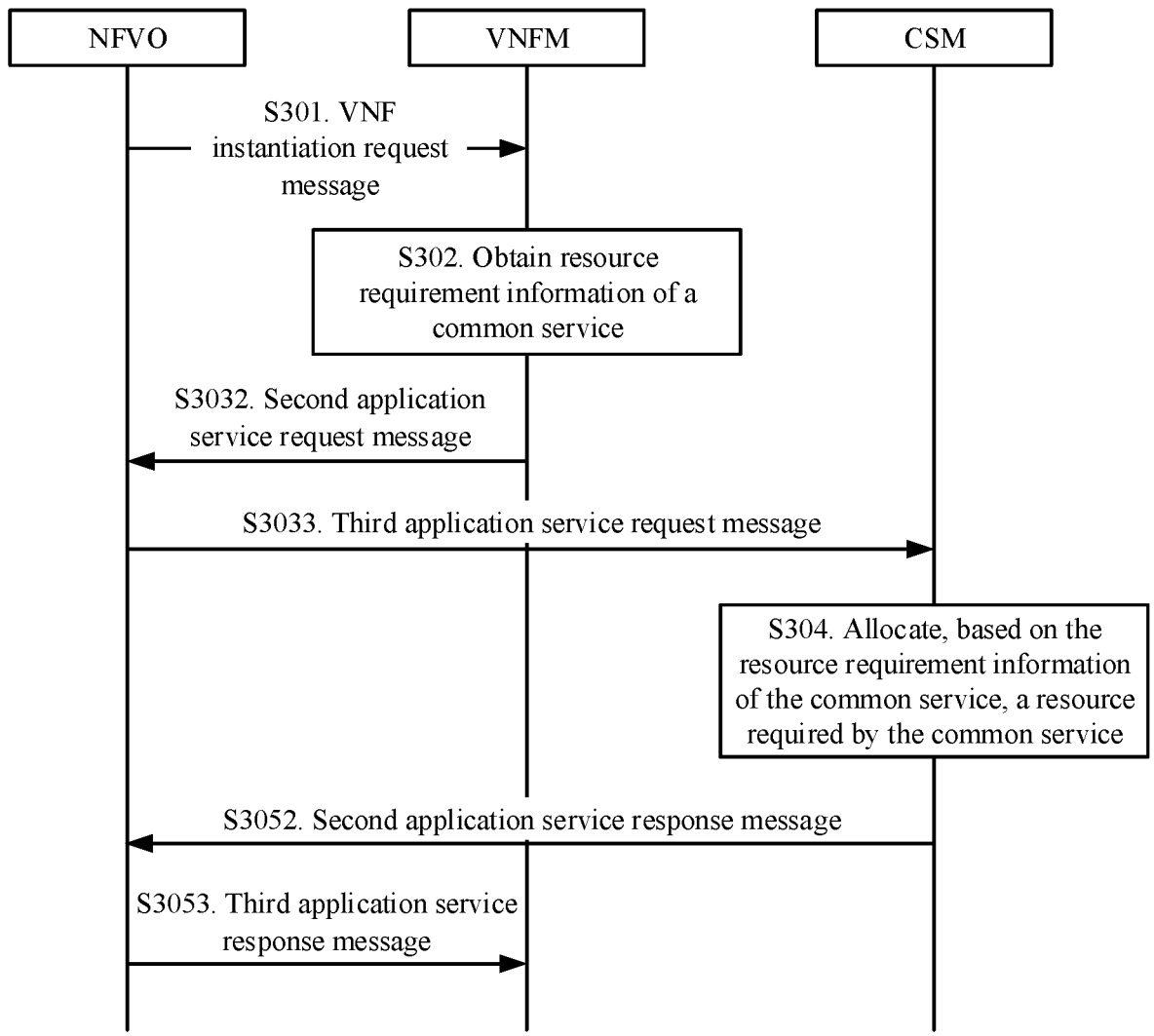
FIG. 6 is a schematic flowchart of another common service resource application method according to an embodiment of this application.

FIG. 5 and FIG. 6 are schematic flowcharts of another two common service resource application methods according to an embodiment of this application. This embodiment is applicable to an implementation scenario in which the CS is a fixed deployment sharing type of the CS. To be specific, in this embodiment, the CSM allocates, in a pre-deployed CS, a common service resource required by the VNF, so that the CS provides some shared resources for the VNF to provide a common service. The method includes but is not limited to the following steps.

S301. The NFVO sends a VNF instantiation request message to the VNFM.

S302. The VNFM obtains resource requirement information of the common service.

For specific methods of S301 and S302, refer to S101 and S102, and details are not described herein again.

S303. The VNFM notifies the CSM of the resource requirement information of the common service.

In an implementation scenario shown in FIG. 5, the VNFM may directly send an application service request message to the CSM, and S303 may be specifically S3031.

S3031. The VNFM sends a first application service request message to the CSM, where the first application service request message includes the resource requirement information of the common service.

For specific methods of S3031, refer to S1031, and details are not described herein again.

In an implementation scenario shown in FIG. 6, the VNFM needs to send the application service request message to the CSM by using the NFVO, and S303 may include S3032 and S3033.

S3032. The VNFM sends a second application service request message to the NFVO.

S3033. The NFVO sends a third application service request message to the CSM based on the second application service request message.

For specific methods of S3032 and S3033, refer to S1032 and S1033, and details are not described herein again.

S304. The CSM allocates, based on the resource requirement information of the common service, a resource required by the common service.

In a possible implementation scenario, the resource requirement information of the common service is already quantifiable resource information. In this case, the CSM may directly allocate, based on the resource requirement information of the common service, the resource required by the common service.

In another possible implementation scenario, some or all information of the resource requirement information of the common service may be represented by using other information that cannot be quantized, such as an identifier. Therefore, the CSM may first determine, based on the resource requirement information of the common service, the resource requirement quantization information of the common service corresponding to the resource requirement information of the common service. In other words, the resource requirement information of the common service is converted into quantifiable resource requirement quantization information of the common service. Then, the CSM allocates, based on the resource requirement quantization information of the common service, the resource required by the common service.

For example, for a comparison table of service types, refer to Table 7, and for a comparison table of instance specifications, refer to Table 11. If the resource requirement information in the third application service request message received by the CSM indicates that a service type is 1×1, a quantity of instances is 2, and an instance specification is s11, the resource requirement information of the common service may be converted into resource requirement quantization information of the common service indicating that a service type is a cache, a quantity of instances is 2, and an instance specification is a cache of 10 G. The CSM allocates, based on the resource requirement quantization information of the common service, the resource required by the common service in the pre-deployed CS.

In a possible implementation, two cache instances may be obtained through division from a pre-deployed CS to serve the VNF, where each cache instance includes cache resources of 10 G. In another possible implementation, one cache instance with cache resources of 10 G may be allocated in each of two pre-deployed CSs, to serve the VNF. There may be another allocation manner, which is not specifically limited in this embodiment.

TABLE 11

Instance specification comparison table 2 (example)

| Instance specification | Cache |
|---|---|
| sl1 | 10 G |
| sl2 | 50 G |
| sl3 | 100 G |

Further, when the CSM finds that the pre-deployed CS cannot bear the common service resource required by the VNF, the CSM may further apply, based on the resource requirement information of the common service, to the VIM or another network unit for the resource for scaling out, so that the CS can provide the common service resource required by the VNF. For detailed resource application methods, refer to S104.

For specific methods of S3031, refer to S1031, and details are not described herein again.

Further, in the implementation scenario shown in FIG. 5, S3051 may be further performed after S304.

S3051. When the CSM successfully allocates the resource required by the common service, the CSM sends a first application service response message to the VNFM.

For specific methods of S3051, refer to S1071, and details are not described herein again.

In the implementation scenario shown in FIG. 6, S3052 and S3053 may be further performed after S304.

S3052. The CSM sends a second application service response message to the NFVO.

S3053. The NFVO sends a third application service response message to the VNFM based on the second application service response message.

For specific methods of S3052 and S3053, refer to S1072 and S1073, and details are not described herein again.

Figure 7:
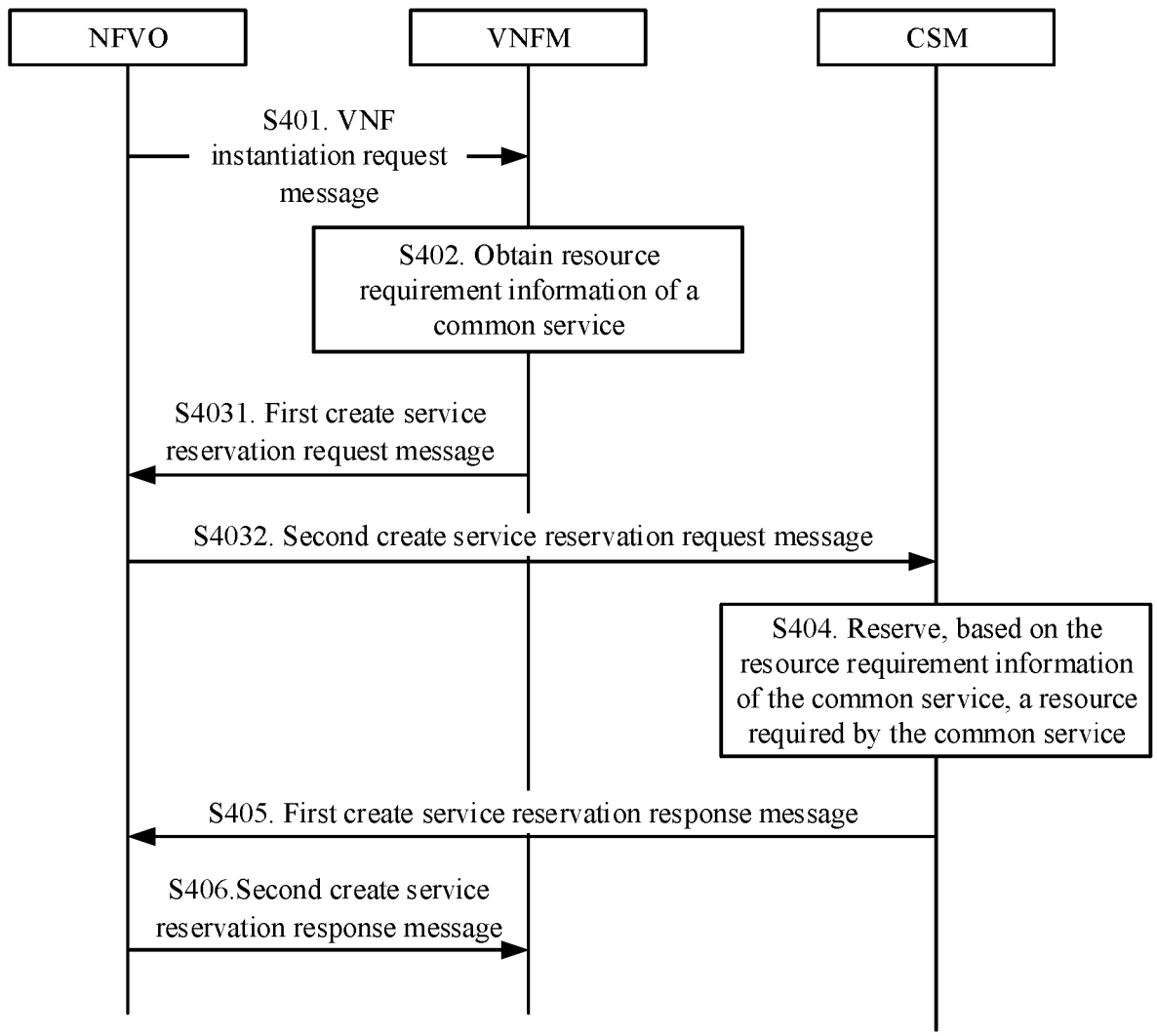
FIG. 7 is a schematic flowchart of another common service resource reservation method according to an embodiment of this application.

FIG. 7 is a schematic flowchart of another common service resource reservation method according to an embodiment of this application. This embodiment is applicable to an implementation scenario in which resource reservation needs to be performed before a common service resource application. Therefore, the method in this embodiment may be coupled with the embodiments shown in FIG. 5 or FIG. 6. To be specific, a resource reservation process is added before the VNFM/NFVO applies to the CSM for a common service resource. Further, this embodiment is applicable to an implementation scenario in which the CS is a fixed deployment sharing type of the CS. To be specific, in this embodiment, the CSM reserves, in a pre-deployed CS, the common service resource required by the VNF, so that the CS reserves some shared resources to provide a common service for the VNF.

S401. The NFVO sends a VNF instantiation request message to the VNFM.

S402. The VNFM obtains resource requirement information of the common service.

It should be noted that, a difference between S401 and S402 in this embodiment and the embodiment shown in FIG. 5 or FIG. 6 lies in that after receiving the VNF instantiation request message, the VNFM triggers a create reservation request for the common service resource instead of an application request.

For another specific implementation of S401 and S402, refer to S101 and S102, and details are not described herein again.

S403. The VNFM notifies the CSM of the resource requirement information of the common service. Details may be S4031 and S4032.

S4031. The VNFM sends a first service create reservation request message to the NFVO.

S4032. The NFVO sends a second service create reservation request message to the CSM based on the first service create reservation request message.

For specific methods of S4031 and S4032, refer to S2031 and S2032, and details are not described herein again.

S404. The CSM reserves, based on the resource requirement information of the common service, a resource required by the common service.

In a possible implementation scenario, the resource requirement information of the common service is already quantifiable resource information. In this case, the CSM may directly reserve, based on the resource requirement information of the common service, the resource required by the common service.

In another possible implementation scenario, some or all information of the resource requirement information of the common service may be represented by using other information that cannot be quantized, such as an identifier. Therefore, the CSM may first determine, based on the resource requirement information of the common service, the resource requirement quantization information of the common service corresponding to the resource requirement information of the common service. In other words, the resource requirement information of the common service is converted into the quantifiable resource requirement quantization information of the common service. Then, the CSM reserves, based on the resource requirement quantization information of the common service, the resource required by the common service.

For example, for the comparison table of service types, refer to Table 7, and for the comparison table of instance specifications, refer to Table 11. If the resource requirement information in the second create service request message received by the CSM indicates that a service type is 1×1, a quantity of instances is 2, and an instance specification is s11, the resource requirement information may be converted into resource requirement quantization information of a common service indicating that a service type is a cache, a quantity of instances is 2, and an instance specification is a cache of 10 G. The CSM reserves, based on the resource requirement quantification information of the common service, the resource required by the common service in the pre-deployed CS.

In a possible implementation, two cache instances may be reserved in one pre-deployed CS to serve the VNF, where each cache instance includes cache resources of 10 G. In another possible implementation, one cache instance with cache resources of 10 G may be reserved in each of two pre-deployed CSs, to serve the VNF. There may be another reservation manner, which is not specifically limited in this embodiment.

S405. When the CSM successfully reserves the resource required by the common service, the CSM sends a first service create reservation response message to the NFVO.

S406. The NFVO sends, based on the first service create reservation response message, a second service create reservation response message to the VNFM.

For specific methods of S405 and S406, refer to S206 and S207, and details are not described herein again.

Figure 8:
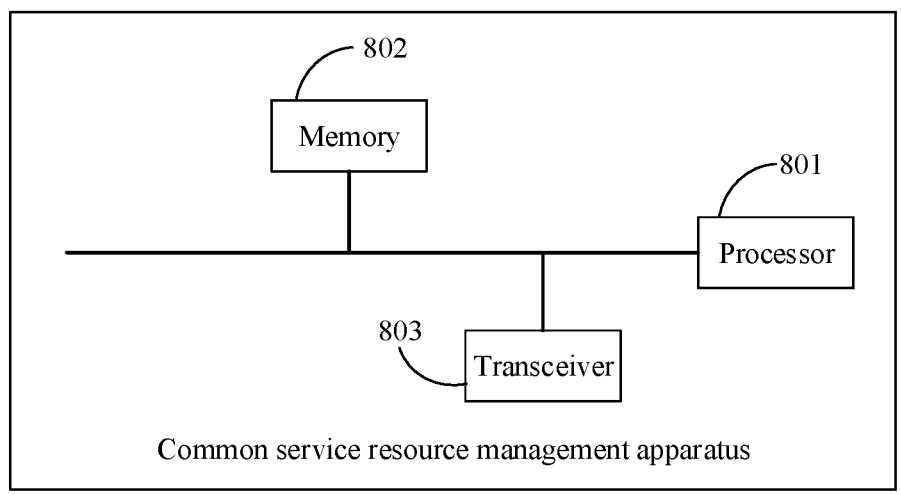
FIG. 8 is a schematic structural diagram of a common service resource management apparatus according to an embodiment of this application.

FIG. 8 is a schematic structural diagram of a common service manager apparatus according to an embodiment of this application. As shown in FIG. 8, a network element includes a processor 801, a memory 802, and a transceiver 803. The processor 801 is connected to the memory 802 and the transceiver 803. For example, the processor 801 may be connected to the memory 802 and the transceiver 803 by using a bus.

The processor 801 is configured to support the CSM unit in performing a corresponding function in the methods shown in FIG. 2 to FIG. 7. The processor 801 may be a central processing unit (CPU), a network processor (NP), a hardware chip, or any combination thereof The hardware chip may be an application-specific integrated circuit (ASIC), a programmable logic device (PLD), or a combination thereof. The PLD may be a complex programmable logic device (CPLD), a field programmable gate array (FPGA), a generic array logic (GAL), or a combination of the complex programmable logic device, the field programmable gate array, and the generic array logic.

The memory 802 is configured to store program code and the like. The memory 802 may include a volatile memory, for example, a random access memory (RAM). The memory 802 may also include a nonvolatile memory, for example, a read-only memory (ROM), a flash memory, a hard disk drive (HDD), or a solid-state drive (SSD). The memory 802 may further include a combination of memories of the foregoing types.

The transceiver 803 may be a communications module and a transceiver circuit, and is configured to transmit information such as data and signaling between the CSM unit and another network unit.

The processor 801 may invoke the program code to perform the following operations:

receiving resource requirement information of a common service required by a VNF; and requesting, based on the resource requirement information of the common service, a VIM unit to allocate a resource required by the common service of the VNF.

Optionally, the processor is specifically configured to:

receive, from an NFVO unit by using an interface between the CSM unit and the NFVO unit, the resource requirement information of the common service required by the VNF; or receive, from a VNFM unit by using an interface between the CSM unit and the VNFM unit, the resource requirement information of the common service required by the VNF.

Optionally, the resource requirement information of the common service required by the VNF is obtained by the VNFM unit based on a virtualized network function descriptor VNFD carried in a received VNF instantiation request message.

Optionally, the processor is specifically configured to:

request, based on the resource requirement information of the common service by using an interface between the CSM unit and the VIM unit, the VIM unit to allocate the resource required by the common service of the VNF; or request, based on the resource requirement information of the common service by using the interface between the CSM unit and the VNFM unit, the VNFM unit to allocate the resource required by the common service, to instruct the VNFM unit to request the VIM unit to allocate the resource required by the common service of the VNF.

Optionally, the processor is further configured to:

request, based on the resource requirement information of the common service, the VIM unit to reserve the resource required by the common service of the VNF.

Optionally, the processor is specifically configured to:

request, based on the resource requirement information of the common service by using the interface between the CSM unit and the VIM unit, the VIM unit to reserve the resource required by the common service of the VNF; or request, based on the resource requirement information of the common service by using the interface between the CSM unit and the VNFM unit, the VNFM unit to reserve the resource required by the common service, to instruct the VNFM unit to request the VIM unit to reserve the resource required by the common service of the VNF.

Optionally, the common service resource requirement information of the VNF includes a service type, an instance specification, and an instance quantity.

Optionally, parameter types of the service type and the instance specification are identifiers, and a parameter type of the instance quantity is an integer.

Optionally, the service type and the instance specification are indicated by a common service member in the VNFD, and the instance quantity is indicated by a common service constituent member in a deployment configuration of the VNFD.

Figure 9:
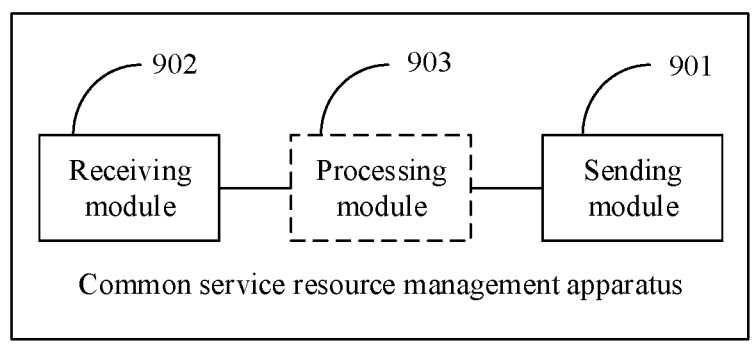
FIG. 9 is a schematic structural diagram of another common service resource management apparatus according to an embodiment of this application.

FIG. 9 is a schematic structural diagram of another common service manager unit according to an embodiment of this application. As shown in FIG. 9, the apparatus includes a sending module 901 and a receiving module 902, and optionally, may further include a processing module 903. The processing module 903 implements functions of the processor shown in FIG. 8. The sending module 901 implements, in combination with the receiving module 902, functions of the transceiver shown in FIG. 8.

A person of ordinary skill in the art may understand and implement all or some of the processes of the methods in the embodiments. The processes may be implemented by a computer program instructing related hardware. The program may be stored in a computer readable storage medium. When the program is run, the processes of the methods in the embodiments are performed. The foregoing storage medium includes any medium that can store program code, such as a ROM or a random access memory RAM, a magnetic disk or an optical disc.

What is claimed is:

1. A common service resource application method, applied to a network functions virtualization (NFV) network, comprising:

receiving, by a common service manager (CSM) that includes a processor coupled to a transceiver, resource requirement information of a common service required by a virtual network function (VNF), wherein the resource requirement information of the common service of the VNF comprises a service type, an instance specification, and an instance quantity, and wherein the service type and the instance specification are indicated by a common service member in a virtualized network function descriptor (VNFD), and the instance quantity is indicated by a common service constituent member in a deployment configuration of the VNFD, wherein the receiving comprises:

receiving, by the CSM from a network functions virtualization orchestrator (NFVO) by using an interface between the CSM and the NFVO, the resource requirement information of the common service required by the VNF, wherein the resource requirement information of the common service is sent by a virtualized network function manager (VNFM) to the NFVO, wherein the CSM unifies respective interfaces for the NFVO and the VNFM to reserve resources and manage lifecycle of the common service;

and wherein the common service resource application method further comprises:

requesting, by the CSM based on the resource requirement information of the common service required by the VNF, a virtualized infrastructure manager (VIM) to allocate a resource required by the common service of the VNF.

2. The method according to claim 1, wherein the resource requirement information of the common service required by the VNF is obtained by the VNFM based on a virtualized network function descriptor (VNFD) carried in a received VNF instantiation request message.

3. The method according to claim 1, wherein the requesting, by the CSM based on the resource requirement information of the common service, the VIM to allocate a resource required by the common service of the VNF comprises:

requesting, by the CSM based on the resource requirement information of the common service by using an interface between the CSM and the VIM, the VIM to allocate the resource required by the common service of the VNF.

4. The method according to claim 1 further comprising:

requesting, by the CSM based on the resource requirement information of the common service, the VIM to reserve the resource required by the common service of the VNF, wherein the requesting the VIM to reserve the resource required by the common service of the VNF occurs before the requesting, by the CSM based on the resource requirement information of the common service, the VIM to allocate a resource required by the common service of the VNF.

5. The method according to claim 4, wherein the requesting, by the CSM based on the resource requirement information of the common service, the VIM to reserve the resource required by the common service of the VNF comprises:

requesting, by the CSM based on the resource requirement information of the common service by using an interface between the CSM and the VIM, the VIM to reserve the resource required by the common service of the VNF.

6. The method according to claim 1, wherein parameter types of the service type and the instance specification are identifiers, and a parameter type of the instance quantity is an integer.

7. A common service resource application apparatus comprising: a common service manager (CSM), a virtualized infrastructure manager (VIM), a network functions virtualization orchestrator (NFVO), and a virtualized network function manager (VNFM), wherein the CSM includes a processor coupled to a transceiver and is configured to:

receive resource requirement information of a common service required by a virtual network function (VNF), wherein the resource requirement information of the common service of the VNF comprises a service type, an instance specification, and an instance quantity, and wherein the service type and the instance specification are indicated by a common service member in a virtualized network function descriptor (VNFD), and the instance quantity is indicated by a common service constituent member in a deployment configuration of the VNFD, and request, based on the resource requirement information of the common service required by the VNF, the VIM to allocate a resource required by the common service required by the VNF, wherein the CSM is configured to receive the resource requirement information of the common service required by the VNF (i) from the NFVO by using an interface between the CSM and the NFVO, wherein the resource requirement information of the common service is sent by the VNFM to the NFVO, or (ii) from the VNFM by using an interface between the CSM and the VNFM, wherein the CSM unifies the respective interfaces for the NFVO and the VNFM to reserve resources and manage lifecycle of the common service; and the VIM is configured to: receive a request for allocating the resource required by the common service required by the VNF, and allocate the resource to the common service.

8. The apparatus according to claim 7, wherein the VNFM is configured to: send, to the CSM by using the interface between the CSM and the VNFM, the resource requirement information of the common service required by the VNF, and the CSM is configured such that, when the CSM is receiving the resource requirement information of the common service, the CSM receives, from the VNFM by using the interface between the CSM and the VNFM, the resource requirement information of the common service required by the VNF; or the VNFM is configured to: send, to the NFVO, the resource requirement information of the common service required by the VNF, the NFVO is configured to: send, to the CSM by using the interface between the CSM and the NFVO, the resource requirement information of the common service required by the VNF, and the CSM is configured such that, when the CSM is receiving the resource requirement information of the common service, the CSM receives, from the NFVO by using the interface between the CSM and the NFVO, the resource requirement information of the common service required by the VNF.

9. The apparatus according to claim 8, wherein the NFVO is further configured to: send a VNF instantiation request message to the VNFM, wherein the VNF instantiation request message carries a virtualized network function descriptor (VNFD); and the VNFM is further configured to: receive the VNF instantiation request message from the NFVO, and obtain the resource requirement information of the common service required by the VNF in the VNFD.

10. The apparatus according to claim 8, wherein when requesting, based on the resource requirement information of the common service, the VIM to allocate a resource required by the common service of the VNF, the CSM is configured to:
   request, based on the resource requirement information of the common service by using an interface between the CSM and the VIM, the VIM to allocate the resource required by the common service of the VNF; or
   request, based on the resource requirement information of the common service through the VNFM by using the interface between the CSM and the VNFM, the VIM to allocate the resource required by the common service of the VNF.

11. The apparatus according to claim 7, wherein the CSM is further configured to:
   request, by the CSM based on the resource requirement information of the common service, the VIM to reserve the resource required by the common service of the VNF.

12. The apparatus according to claim 7, wherein the resource requirement information of the common service of the VNF comprises a service type, an instance specification, and an instance quantity.

13. The apparatus according to claim 12, wherein parameter types of the service type and the instance specification are identifiers, and the parameter type of the instance quantity is an integer.

14. A non-transitory computer readable storage medium, comprising programming instructions stored thereon, wherein the programming instructions are executable by at least one computer to cause the at least one computer to perform a common service resource application method including:
   receiving resource requirement information of a common service required by a virtual network function (VNF), wherein the resource requirement information of the common service of the VNF comprises a service type, an instance specification, and an instance quantity, and wherein the service type and the instance specification are indicated by a common service member in a virtualized network function descriptor (VNFD), and the instance quantity is indicated by a common service constituent member in a deployment configuration of the VNFD; and
   requesting, based on the resource requirement information of the common service required, a virtualized infrastructure manager (VIM) to allocate a resource required by the common service of the VNF,
   wherein receiving the resource requirement information of the common service required by the VNF comprises:
      receiving, from a network functions virtualization orchestrator (NFVO) by using an interface between a common service manager (CSM) and the NFVO, the resource requirement information of the common service required by the VNF, wherein the resource requirement information of the common service is sent by a virtualized network function manager (VNFM) to the NFVO, and wherein the CSM unifies respective interfaces for the NFVO and the VNFM to reserve resources and manage lifecycle of the common service.

* * * * *